United States Patent
Rosa

(10) Patent No.: US 10,331,884 B2
(45) Date of Patent: Jun. 25, 2019

(54) METHOD AND SYSTEM FOR COUNTERING RANSOMWARE

(71) Applicant: Stephen Rosa, Reno, NV (US)

(72) Inventor: Stephen Rosa, Reno, NV (US)

( * ) Notice: Subject to any disclaimer, the term of this patent is extended or adjusted under 35 U.S.C. 154(b) by 0 days.

(21) Appl. No.: 15/728,826

(22) Filed: Oct. 10, 2017

(65) Prior Publication Data

US 2018/0101678 A1 Apr. 12, 2018

Related U.S. Application Data

(60) Provisional application No. 62/406,129, filed on Oct. 10, 2016.

(51) Int. Cl.
*G06F 3/06* (2006.01)
*G06F 21/55* (2013.01)
(Continued)

(52) U.S. Cl.
CPC .......... *G06F 21/552* (2013.01); *G06F 3/0622* (2013.01); *G06F 3/0653* (2013.01);
(Continued)

(58) Field of Classification Search
CPC ............. H02J 2007/0062; H02J 7/0013; H02J 7/0021; H02J 7/0026; H02J 7/0054;
(Continued)

(56) References Cited

U.S. PATENT DOCUMENTS 5,351,134 A * 9/1994 Yaguchi ............. H04N 1/33323
358/405
5,859,968 A 1/1999 Brown et al.
(Continued)

FOREIGN PATENT DOCUMENTS

CN 2566497 Y 8/2003
CN 2879281 Y 3/2007
(Continued)

OTHER PUBLICATIONS

"Could Your Business Survive a Cryptor?" KasperSky Lab, (2015), 13 pages.
(Continued)

*Primary Examiner* — Joseph P Hirl
*Assistant Examiner* — Sayed Aresh Beheshti Shirazi
(74) *Attorney, Agent, or Firm* — Edell, Shapiro & Finnan, LLC

(57) ABSTRACT

Methods, systems and computer readable media are provide for protecting stored data from ransomware. In an embodiment, the data is stored in an external drive connected to the processor. The connection between the processor and external drive is interrupted (e.g., open) except during a data transfer between the processor and the external drive. Connection of the processor to the external drive, permitted for a time period specified by a user or until the transfer of data is complete, occurs in response to manual actuation of a control means interposed between the processor and external drive and optionally, an indication from the user computing system that malware has not been detected on the device. The control means may be a mechanical switch or a fingerprint authentication device.

23 Claims, 10 Drawing Sheets

(51) Int. Cl.
  *G06F 21/32* (2013.01)
  *G06F 13/38* (2006.01)
  *G06F 13/42* (2006.01)
  *G06F 21/56* (2013.01)
  *G06F 21/81* (2013.01)
  *H04L 29/08* (2006.01)

(52) U.S. Cl.
  CPC .......... *G06F 3/0671* (2013.01); *G06F 13/385* (2013.01); *G06F 13/4282* (2013.01); *G06F 21/32* (2013.01); *G06F 21/562* (2013.01); *G06F 21/81* (2013.01); *H04L 67/06* (2013.01)

(58) Field of Classification Search
  CPC . G06F 21/645; G06F 21/6218; H04L 63/123; H04L 2463/121; H04L 63/08; H04L 63/102
  See application file for complete search history.

(56) References Cited

U.S. PATENT DOCUMENTS

| | | | |
|---|---|---|---|
| 6,330,648 B1* | 12/2001 | Wambach | G06F 21/80 711/154 |
| 6,880,110 B2 | 4/2005 | Largman et al. | |
| 7,000,054 B2 | 2/2006 | Kwong et al. | |
| 7,100,075 B2 | 8/2006 | Largman et al. | |
| 7,353,992 B2 | 4/2008 | Sugawara et al. | |
| 8,111,135 B2 | 2/2012 | Wong et al. | |
| 8,826,043 B2 | 9/2014 | Moran et al. | |
| 8,922,372 B2* | 12/2014 | Soffer | G06F 13/4068 340/568.1 |
| 8,978,136 B2 | 3/2015 | Day | |
| 9,300,678 B1* | 3/2016 | Stack | G06F 21/6218 |
| 9,355,265 B2 | 5/2016 | Wang et al. | |
| 9,514,309 B1* | 12/2016 | Mann | G06F 21/60 |
| 9,614,886 B2* | 4/2017 | Zhong | H04L 65/602 |
| 9,621,565 B2* | 4/2017 | Stack | G06F 21/6218 |
| 9,832,017 B2* | 11/2017 | Malone | H04L 9/3263 |
| 2002/0078366 A1* | 6/2002 | Raice | G06F 21/56 726/26 |
| 2003/0065922 A1* | 4/2003 | Fredlund | H04L 63/0823 713/176 |
| 2004/0003262 A1 | 1/2004 | England et al. | |
| 2005/0132184 A1* | 6/2005 | Palliyil | G06F 21/56 713/152 |
| 2008/0077527 A1* | 3/2008 | Choe | G06Q 20/20 705/44 |
| 2008/0104694 A1 | 5/2008 | Powell et al. | |
| 2008/0114956 A1* | 5/2008 | Safa | G06F 12/1466 711/163 |
| 2008/0218959 A1* | 9/2008 | Wu | G06F 1/187 361/679.31 |
| 2008/0247531 A1* | 10/2008 | Borislow | H04M 3/42068 379/218.01 |
| 2009/0153340 A1* | 6/2009 | Pinder | H04B 1/44 340/665 |
| 2009/0289122 A1* | 11/2009 | Jansen | G06K 19/07345 235/492 |
| 2010/0049895 A1* | 2/2010 | Liang | H04M 1/72527 710/308 |
| 2010/0321157 A1* | 12/2010 | Chen | G06F 21/32 340/5.83 |
| 2011/0087690 A1* | 4/2011 | Cairns | G06F 21/6218 707/769 |
| 2012/0254967 A1* | 10/2012 | Braun | G06F 21/32 726/7 |
| 2012/0260342 A1 | 10/2012 | Dube et al. | |
| 2013/0035740 A1* | 2/2013 | Sharma | A61N 1/36007 607/40 |
| 2013/0041948 A1* | 2/2013 | Tseng | H04L 67/06 709/204 |
| 2014/0049653 A1* | 2/2014 | Leonard | G06T 1/0042 348/207.1 |
| 2014/0125490 A1* | 5/2014 | Ullrich | B65F 1/141 340/870.01 |
| 2014/0198687 A1* | 7/2014 | Raleigh | H04L 67/327 370/259 |
| 2014/0245439 A1 | 8/2014 | Day | |
| 2014/0297810 A1* | 10/2014 | Zhong | H04L 65/602 709/219 |
| 2014/0324986 A1* | 10/2014 | Zhang | H04L 51/046 709/206 |
| 2014/0325654 A1* | 10/2014 | Denis | G06F 21/567 726/24 |
| 2015/0074820 A1 | 3/2015 | Toda et al. | |
| 2015/0154436 A1* | 6/2015 | Shi | H04L 63/0861 382/124 |
| 2015/0213324 A1* | 7/2015 | Farid | G06K 9/00577 382/218 |
| 2015/0224310 A1* | 8/2015 | Sharma | A61N 1/36007 607/40 |
| 2016/0344749 A1* | 11/2016 | McAlear | G06F 21/55 |
| 2017/0041306 A1* | 2/2017 | Stack | G06F 21/6218 |
| 2017/0110898 A1* | 4/2017 | Kyriakoulis | H02J 7/0042 |
| 2017/0118493 A1* | 4/2017 | Hain | H04L 65/80 |
| 2017/0180277 A1* | 6/2017 | Brady | H04L 51/066 |
| 2017/0374622 A1* | 12/2017 | Visuri | H04W 52/0254 |
| 2018/0026932 A1* | 1/2018 | Wang | H04L 51/38 455/466 |

FOREIGN PATENT DOCUMENTS

| | | |
|---|---|---|
| CN | 203151637 U | 8/2013 |
| CN | 103530556 A | 1/2014 |
| CN | 105550128 A | 5/2016 |
| TW | 200842641 A | 11/2008 |
| WO | 2014111920 A1 | 7/2014 |

OTHER PUBLICATIONS

International Search Report and the Written Opinion, PCT/US2017/055842, dated Dec. 15, 2017, 9 pages.

* cited by examiner

METHOD AND SYSTEM FOR COUNTERING RANSOMWARE

CROSS-REFERENCE TO RELATED APPLICATIONS

This application claims the benefit of U.S. Provisional Patent Application No. 62/406,129 filed on Oct. 10, 2016, the disclosure of which is incorporated by reference herein in its entirety.

TECHNICAL FIELD

The present embodiments are related to techniques for implementing cybersecurity and countering ransomware.

BACKGROUND

Ransomware is a type of malware that can be covertly installed on a computer that restricts access to the infected computer system in some way, and demands are made that the user pay a ransom to the malware operators to remove the restriction. The cryptovirology form of the attack involves the ransomware systematically encrypting files on the system's hard drive which become difficult or impossible to decrypt without paying a ransom for the decryption key. Other attacks may simply lock the system and display messages intended to coax the user into paying. Ransomware typically propagates as a Trojan whose payload is disguised as a seemingly legitimate file.

As with other forms of malware, security software might not detect a ransomware payload, or especially in the case of encrypting payloads, might do so only after encryption is underway or complete, particularly if a new version unknown to the protective software is distributed. If an attack is suspected or detected in its early stages, it takes some time for encryption to take place; immediate removal of the malware (a relatively simple process) before it has completed its malicious encryption would stop further damage to data without salvaging any data already lost. Security experts have suggested precautionary measures for dealing with ransomware. Using software or other security policies to block known payloads from launching will help to prevent infection, but will not protect against all attacks. Keeping "offline" backups of data stored in locations inaccessible to the infected computer, such as external storage drives, prevents them from being accessed by the ransomware, thus accelerating data restoration.

While the admonition to keep "offline" backups in locations inaccessible to the infected computer makes compelling sense, enacting this policy incurs cost, and is often difficult and time consuming to implement. Additionally, such counter-Ransomware schemes presume that these backup files are maintained in pristine condition. For example, a leading cyber security firm recommends that victims of a ransomware attack: (1) refuse to pay the ransom, as this serves to encourage and fund the cyberattackers and there is no guarantee that the encrypted files will be returned upon payment, (2) remove the impacted system from the network to remove the immediate threat, and to prevent further spread of the threat, and (3) restore impacted files from a known good backup. Restoration of files from a backup is considered to be the industry standard regarding regaining access to data.

However, small and medium sized businesses (SMB) are challenged to meet this recommendation. Client data is often one of the most important assets the company owns, and is in constant use and undergoing constant modification in the course of day-to-day operations. Keeping sales and other records readily at hand is essential. Following a pro-active regimen of backing up all files to a secure storage device (or even a cloud storage option) is typically accomplished at the end of the business day when the PC/workstation is typically shut down.

This approach of implementing daily backups implies that the data files, both those in use and in the 'secure' backup, are not vulnerable to ransomware attack during the workday. This is definitely not the case. Unless the backup files (expected to restore data and business operations after a ransomware attack) are kept separate and apart from the minute-by-minute operations of the computer or workstation, the files are vulnerable. "Apart" in this context means that these backup files cannot be accessed in any way by the ransomware encryption process and so would be immediately available to use once the virus is removed from the computer or workstation in question or when connected to another computer or workstation that is known to be ransomware-virus free. The backup files must also be kept current; data files that are not current have limited value; especially in financial operations.

The impact of ransomware today is growing. An analysis by Kaspersky Lab, one of the world's leading software security organizations, estimates that more than 2.3 million users were the victims of ransomware attacks between April 2015 and March 2016, a jump of 18% over the prior year. This includes the malware that holds the user's data itself hostage by encrypting it—the so-called 'cryptors.' Cryptors today account for over 32% of all ransomware attacks, and that percentage continues to grow. Corporate users represent about 13% of the victim population in that period, nearly double the percentage from the year before. This is significant on several fronts, not only is the problem of ransomware increasing, but also, the attacks continue to become more sophisticated. Corporate IT staff have been unable to effectively mitigate this threat, as the frequency of attacks continues to increase in this market segment, indicating that an effective solution to this problem is not yet available.

Various suppliers and consultants promote the use of cloud-based storage as a means to defeat ransomware attacks, the idea being that backing up critical data in a public, private or hybrid cloud storage will keep data safe. However, even in cloud-based storage, data files are vulnerable if a ransomware virus can reach and encrypt the files.

This is especially problematic for individuals and small to medium sized businesses (SMBs), the vast majority of the victims of ransomware attacks, who lack sufficient IT staff, budgets and skills to set up effective cloud-based Storage-as-a-Service (SaaS) operations. However, even with this approach, data is still vulnerable.

Thus, there is an ongoing need for simple, low cost counter-ransomware solutions that can be used by any computer or workstation user to defeat current or potential versions and variants of ransomware threats.

SUMMARY

The invention philosophy centers on the mode of entry of the ransomware virus to a typical computer, which occurs through a network connection, e.g., such as the Internet. The virus may be incorporated in an email message or other vehicle received or downloaded via the network connection and triggered, once past any firewalls or security software. The invention philosophy further presumes that the storage media used as a backup will not use the same entry/exit path as the network/Internet connection. This is standard on many computers, given that the typical hardwired connection for a computer to the Internet is a Cat5 or Cat6 cable and the typical hardwired connection for the computer to the storage media is based on a USB connector or FireWire connection.

Given the rapid increase in the use of mobile platforms for work, the second pathway for a ransomware attack to reach the computer is via a WiFi® connection. The present invention applies irrespective of the entry path used by the ransomware.

Persons skilled in the art will recognize the challenge of ensuring that the air gap switch is bridged (connected) during legitimate data transfer events. While higher-level synchronous data replication schemes, for example, are implemented by large businesses, such schemes are costly and require sophisticated equipment (e.g., RAID arrays, etc.) that is largely inaccessible to small businesses. Complicated processes are typically the domain of large corporate activities, and therefore, such users are not the primary target users of the present invention.

DETAILED DESCRIPTION

Figure 1:
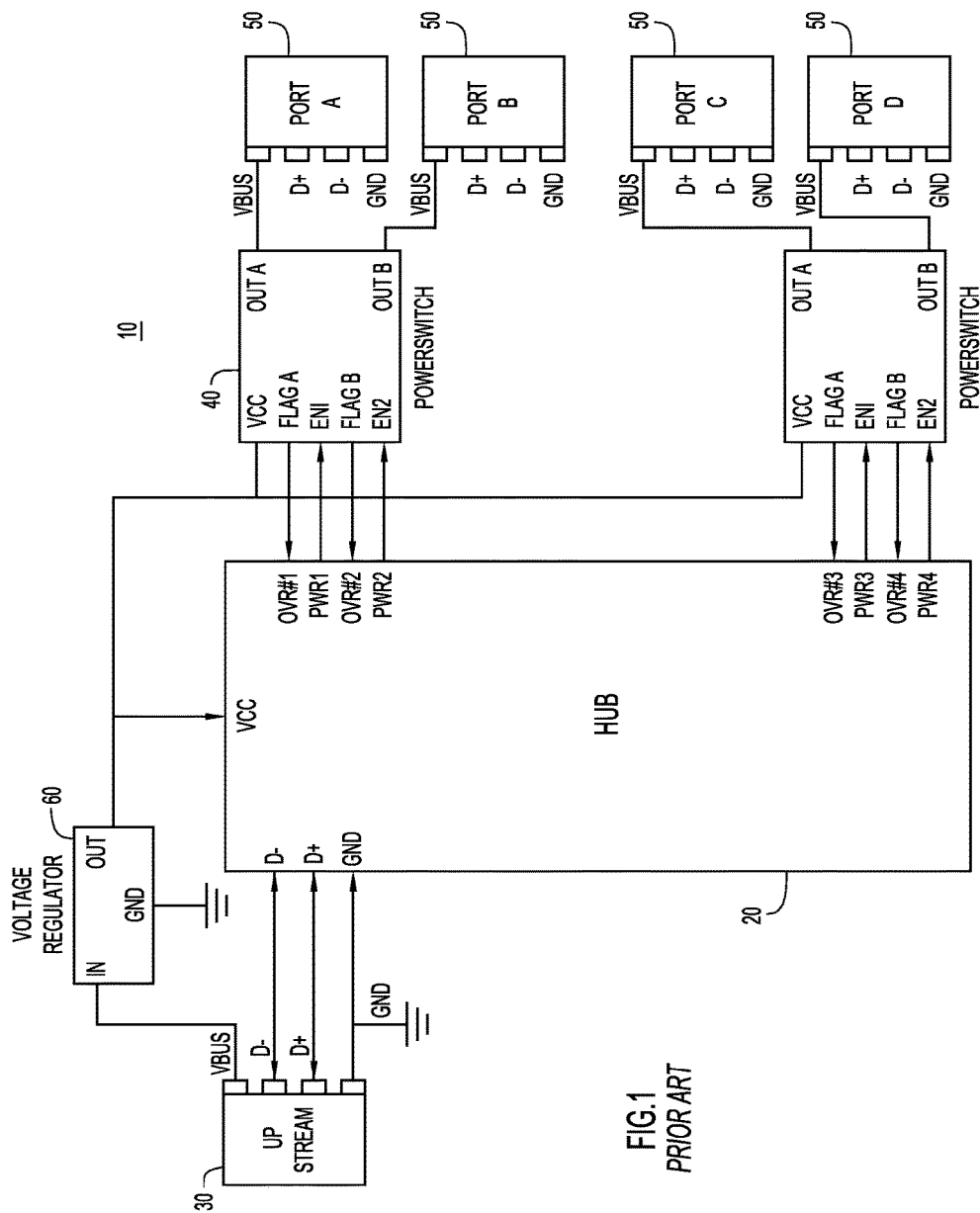
FIG. 1 shows an example USB hub known in the prior art.

FIG. 1 shows an example of a USB Hub 10 (see, e.g., http://www.edn.com/5G/4417792/Master-USB-2-0-Hub-power-management) known in the art. In this example, HUB (controller) 20 connects to upstream component 30 and downstream components power switches 40 and ports 50. A voltage regulator 60 is also provided to regulate power from Vbus to HUB 20, and each of the power switches 40.

Figure 2:
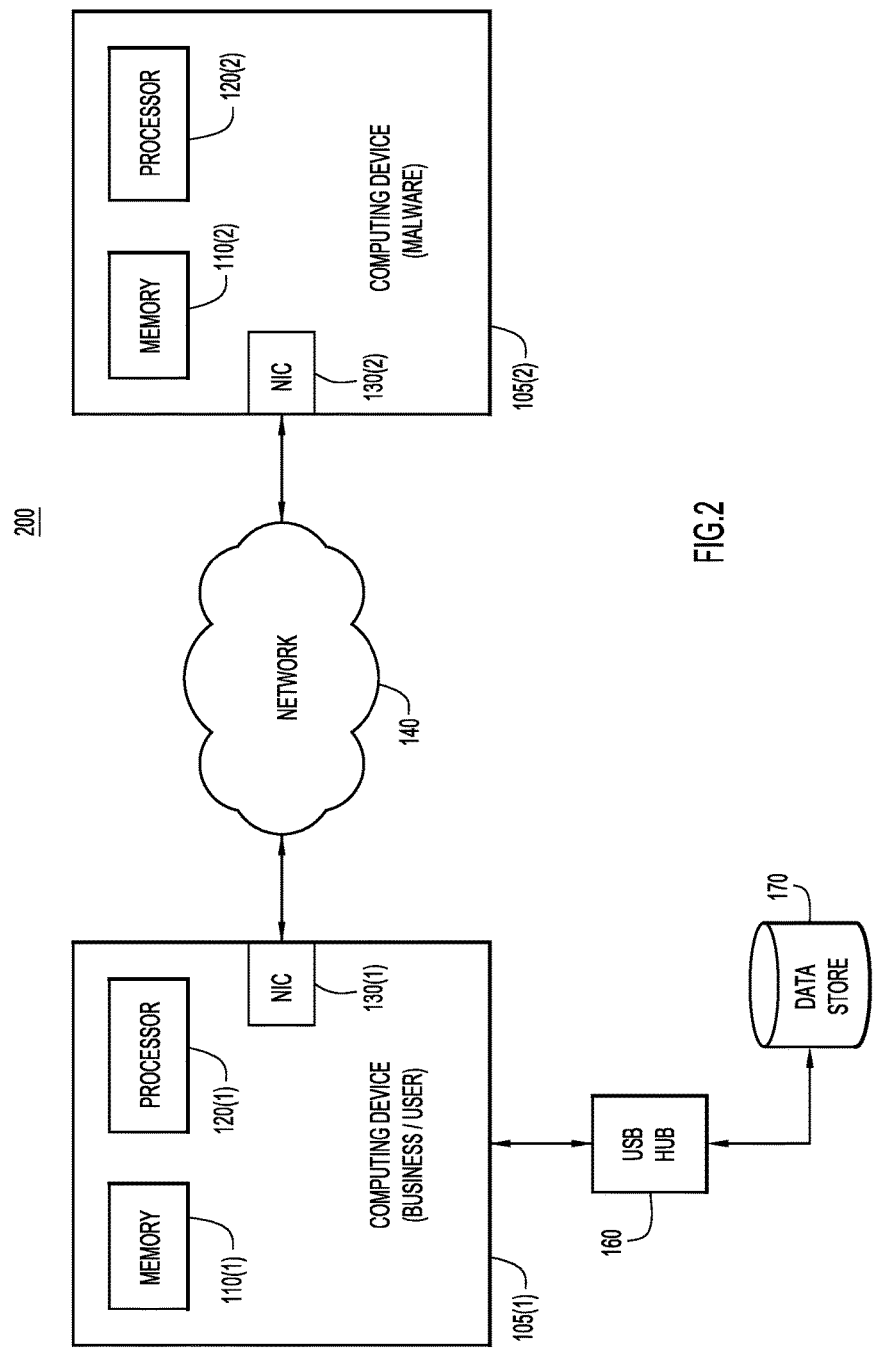
FIG. 2 is an example computing environment according to an embodiment of the techniques disclosed herein.

FIG. 2 shows an example computing environment 200 according to an embodiment of the invention. A computing device associated with, for example, a small business or user 105(1) and a computing device associated with malware 105(2) are both connected to network 140. Business/user computing device 105(1) comprises a memory 110(1), a processor 120(1), and a NIC 130(1). Business/user associated computing device 105(1) is also connected to an external data store 170(1)-170(4), via USB Hub 160. Data store 170(1)-170(4) contains a copy of data stored on computing device 105(1). Other components (not shown) that may also be present with regard to computing devices 105(1) include user inputs such as keyboards, user display devices such as LED screens, etc.

Malware associated computing device 105(2) comprises a memory 110(2), a processor 120(2) and a NIC 130(2), and may be a peer computer that has become infected with malware, a remote computer that has become infected with malware, or a computer at which the malware originates. Malware computer 105(2) may transmit a communication to computer 105(1), wherein the communication comprises a link, an attachment or other means with which to infect computer 105(1) with ransomware. According to embodiments of the invention, a user of business/user associated computing device 105(1) may be infected with malware via network 140 by opening an email or email attachment, which triggers the installation of files (e.g., disguised as normal) containing malware ransomware on computer 105(1). Alternatively, a user of computer 105(1) may access a website associated with computing device 105(2) which contains malware that is downloaded onto computing device 105(1) upon accessing the website. Other components that may also be present with regard to computing devices 105(2) include user inputs such as keyboards, user display devices such as LED screens, etc.

USB Hub 160 acts a gateway between the computing device 105(1) and the data store 170(1)-170(4), and is configured to operate in two states: (1) connected mode, in which data from computing device 105(1) is transmitted to data store 170(1)-170(4) for storage, and (2) air gap mode, in which data from the computing device is not transmitted to data store 170(1)-170(4), and is physically disconnected from computing device 105(1), as described throughout this application. Thus, in the event that the computing device 105(1) becomes infected, USB Hub 160 isolates data store 170(1)-170(4) from the system, allowing the integrity of the data store 170(1)-170(4) and accessibility of the data to be maintained.

To prevent data store 170(1)-170(4) from being compromised, once malware is detected or suspected of infecting computing device 105(1), USB Hub 160 physically disconnects the transmission path from computing device 105(1) to data store 170(1)-170(4), allowing the stored data to be kept safe (and not compromised by the malware). Although one data store 170(1)-170(4) is shown connected to USB hub 160, it is understood that multiple data store devices may be connected to USB hub 160.

In some embodiments, USB hub 160 may be integrated into the business/user computing device 105(1). In this configuration, the power supply of the USB hub will be separate from the power supply of the computing device 105(1).

Figure 3:
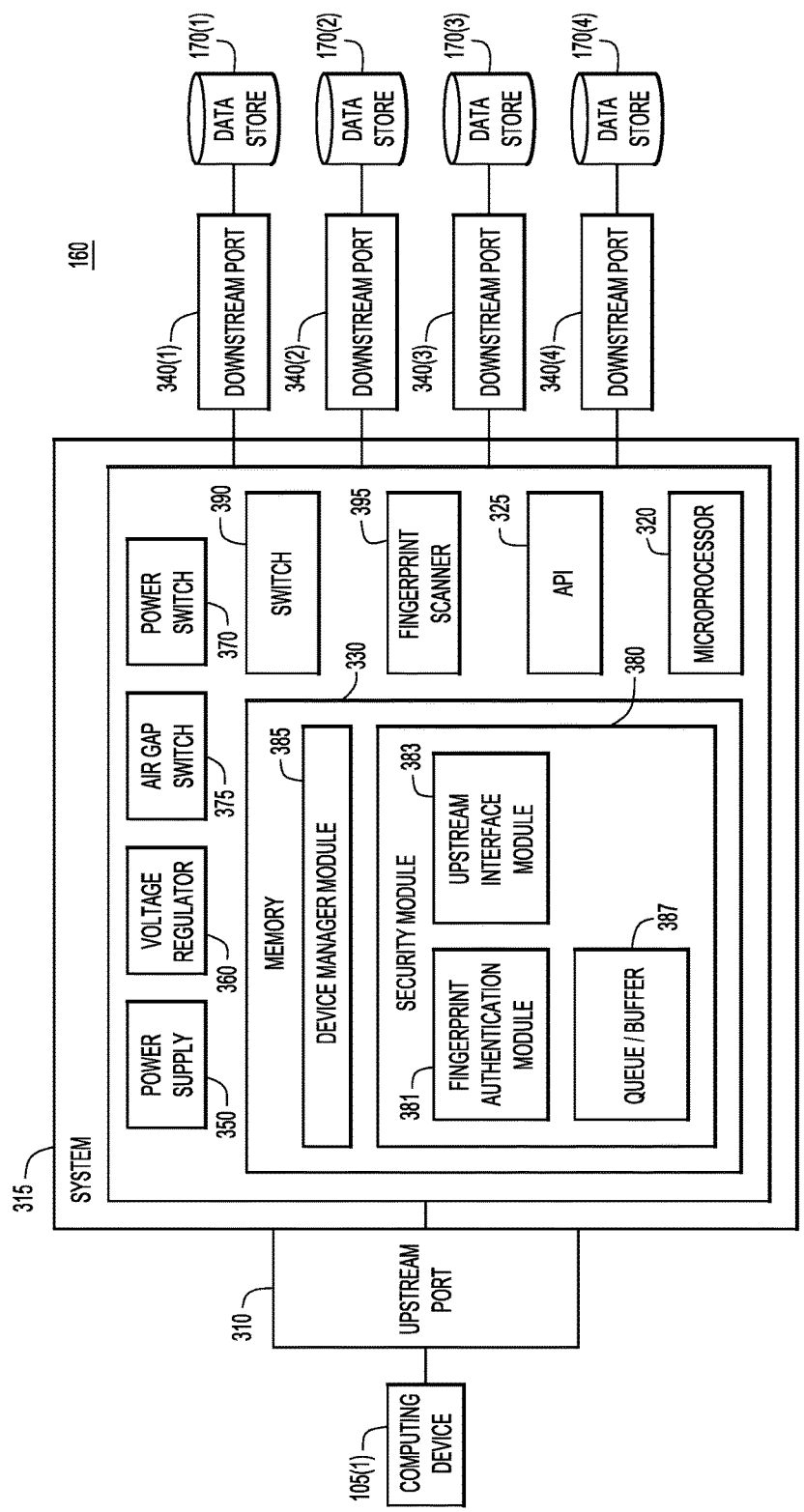
FIG. 3 is an example USB hub, represented as a block diagram according to an embodiment of the techniques disclosed herein.

FIG. 3 shows an example block diagram of a USB hub 160. Other configurations of components having the functionality as described herein are possible, and all such configurations are contemplated for use herein. In this example, USB hub 160 is self-powered, such that the operation of the USB hub, and its ability to provide power to the various storage devices connected to it (e.g., data store 170(1)-170(4)), is derived from a power source independent of the computer or workstation 105(1) or from a bus. In general, it is preferred that a separate power supply, such as power supply 350, be used.

USB Hub 160 includes an upstream port, namely port 310, which connects computing device 105(1) to the system 315 of the USB Hub 160, and ports 340(1)-340(4) which each connect to a data store 170(1)-170(4).

USB Hub 160 further comprises a system 315, which includes a microprocessor 320, for executing instructions stored in memory 330; a power supply 350, which may provide a source of power, e.g., from an AC electrical outlet; a voltage regulator 360, which may condition power from power supply 350 (or power from a bus (Vbus) associated with interface 310); as well as a fingerprint scanner 395 for obtaining fingerprints; an air gap switch 375, which controls whether the path for transmitting data from computing device 105(1) to data store 170(1)-170(4) is open or closed. Manual switch 390 may be used to manually authorize transmission of data. Application Programming Interface (API) module 325 provides an interface with which to program microprocessor 320. Power switch 370 may be connected to one or more ports 340(1)-340(4), which acts to shut down power to the respective individual ports in the event that the combined current draw from all ports exceeds a determined threshold. In some embodiments, memory 330 and processor 320 may be separate, in other embodiments, memory 330 and processor 320 along with I/O pins may be integrated into a controller (see also, FIG. 4). Both configurations are contemplated herein.

In some embodiments, power for self-powered USB hubs may be obtained from a bus, and therefore, interface 310 may also contain power circuitry to receive power from the bus. In other embodiments, power may be supplied from a power supply 350 that converts AC power to DC power. In either case, incoming power may be fed through a voltage regulator 360 in order to provide a suitable power supply for system 315. Voltage regulator 360 may perform voltage conversions (e.g., change a higher voltage/current to a lower voltage/current, or vice-versa; perform filtering and smoothing operations to reduce fluctuations in the power supply, etc.) As an example, a self-powered hub 160 may receive power from a power supply 350 capable of providing full power (e.g., up to 500 mA) to every port 340(1)-340(4). The power supply 350, whether receiving power from an outlet or from a bus, may be configured to power upstream port 310, the array of downstream ports 340(1)-340(4), and associated circuitry of system 315.

Memory 330 may include a fingerprint authentication module 381, an upstream interface/port module 383, a device manager module 385 and a queue/buffer 387. Fingerprint authorization module 381 receives input from fingerprint scanner 395, and determines if the received fingerprint matches the stored fingerprint for authorizing data transfer. If a match is determined, the air gap switch 375 is closed and data transfer proceeds. Examples of such devices may be found in the disclosure in U.S. Pat. No. 8,111,135 (Wong et al), and are incorporated by reference herein.

Upstream interface module 383 receives data from computing device 105(1) and analyzes incoming data/files for signatures that may be associated with malware. For example, upstream interface module 383 may evaluate power, voltage and current abnormalities that may be associated with malware. For example, if large amounts of data are being transferred to the data store, this can manifest as excessive computation usage of the USB data hub. Alternatively, signatures associated with encrypted files or specific file name extensions may be detected, which may also indicate malware. In other embodiments, interface module 383 may receive a signal or other indication from the computing device 105(1) indicating that malware is present, e.g., a signal from an antivirus or anti-malware program, a signal indicating excessive computational usage (e.g., memory consumption, processing usage, etc.), etc. A positive indication will result in a signal being sent to air gap switch 375 to open the circuit (if closed), or will keep air gap switch open (if not closed), thereby discontinuing access to data store 170(1)-170(4) until the malware or threat thereof has been resolved. Upstream interface module 383 may also comprise a timer module, which indicates when a specific period of time has elapsed relative to the start of the data transfer authorization (e.g., air gap switch 375 closed), or may receive signals from switch 390, indicating when a user has manually authorized data transfer (e.g., through toggling or pressing a switch or button accessible on the casing of the USB hub).

Device manager 385 manages the operation of the USB hub, and its various components, e.g., processor speed, memory, pin I/O assignments, etc.

Queue/buffer 335 may act as a temporary repository to store incoming data, e.g., data being transferred from computing device 105(1) to the data store 170(1)-170(4), and vice-versa. Upon receiving user authentication, information stored in the queue/buffer 335 will be transmitted to one or more of data stores 170(1)-170(4). Queue/buffer 335 provides a way to minimize the number of times that a user may need to provide user authentication for writing data to the data store 170(1)-170(4), while helping to preserve the integrity of the data stored on these backup devices, e.g., by preventing incomplete or partial file transfers that lead to corrupt files.

In some aspects, upstream port 310 and downstream ports 340(1)-340(4) may be USB ports compatible with any known USB standard, including USB 1.0 USB 3.1. It is understood that the pinout may change dependent upon the USB standard used.

Techniques for programming USB Hubs, e.g., via API 325, are known in the art including, by way of example only, the Acroname™ Programmable Industrial USB 2.0 Hub, which may be programmed using software instructions performing various functions, with such techniques incorporated by reference herein.

Figure 4:
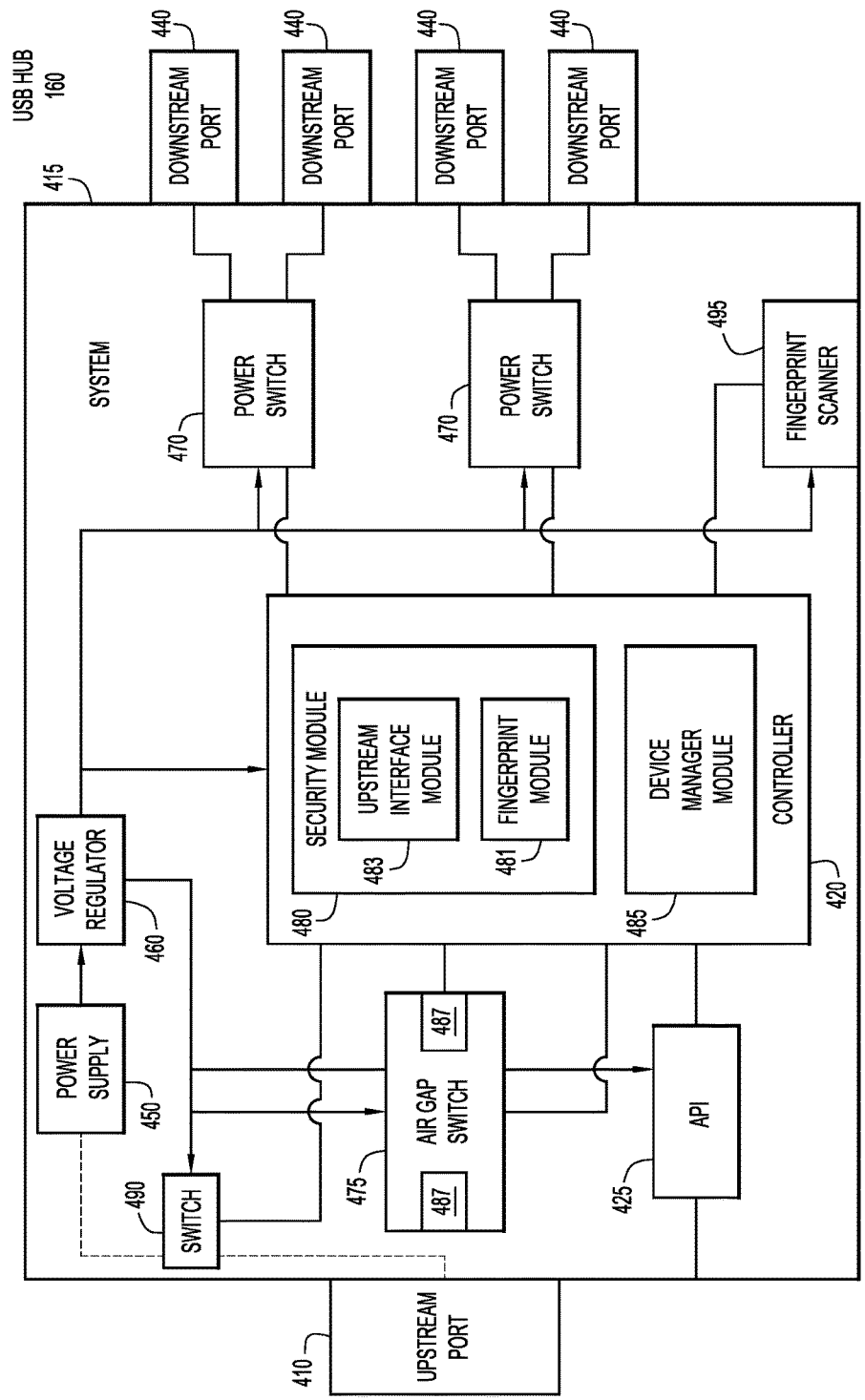
FIG. 4 is another example of a USB hub having a programmable controller, according to an embodiment of the techniques disclosed herein.

FIG. 4 shows an example implementation of the USB hub 160 using a controller 420. API 425, voltage regulator 460 and power switch 470 are also shown. This hub is self-powered and is able to receive power from an external power supply unit 450, or via a Vbus (dashed line) from the computing device 105(1), to provide full power (e.g., up to 500 mA or more) to every port 440. The external power supply 450 is chosen to be sufficient to power upstream port 410, the array of downstream ports 440, and a fingerprint biometric authentication module 481 and associated scanner 495 (also called a fingerprint biometric or a fingerprint recognition device) and associated circuitry. Examples of fingerprint biometric devices may be found in the disclosure in U.S. Pat. No. 8,111,135 (Wong et al.) and are incorporated by reference herein. Examples of commercially available fingerprint scanners include VeriFinger 9.0 Standard SDK and VeriFinger 9.0 Extended SDK, manufactured by Neurotechnology of Lithuania; and Dermalog LF1 manufactured by DERMALOG Identification Systems GmbH of Hamburg, Germany, and are also incorporated by reference herein.

In an embodiment of the invention, the fingerprint authentication module 481 is incorporated as a protection means between the upstream port 410 (i.e., the port connected to the computer 105(1)) and the downstream port(s) 440, which connect to data storage media 170(1)-170(4). In this embodiment, the air gap switch is in an open configuration, such that data is not able to flow from interface 410 to ports 440. In the absence of fingerprint validation, air gap switch 475 acts as a switch or gate that is open to create what is effectively a full open circuit or "air gap" between the upstream and downstream ports.

In this embodiment, software for performing the functions described herein can be provided as part of the hub device (e.g., comprising a programmable controller 420, or for non-programmable controllers/devices, the functions can be incorporated into any other programmable device, and integrated within the USB hub, or connected as an external component to the USB hub. It is understood that this example is intended to be non-limiting as many other configurations are possible. For example, in some embodiments, the functionality may be incorporated into an external fingerprint recognition device and the USB hub may be configured to communicate with the external device to perform the functionality herein.

Figure 5:
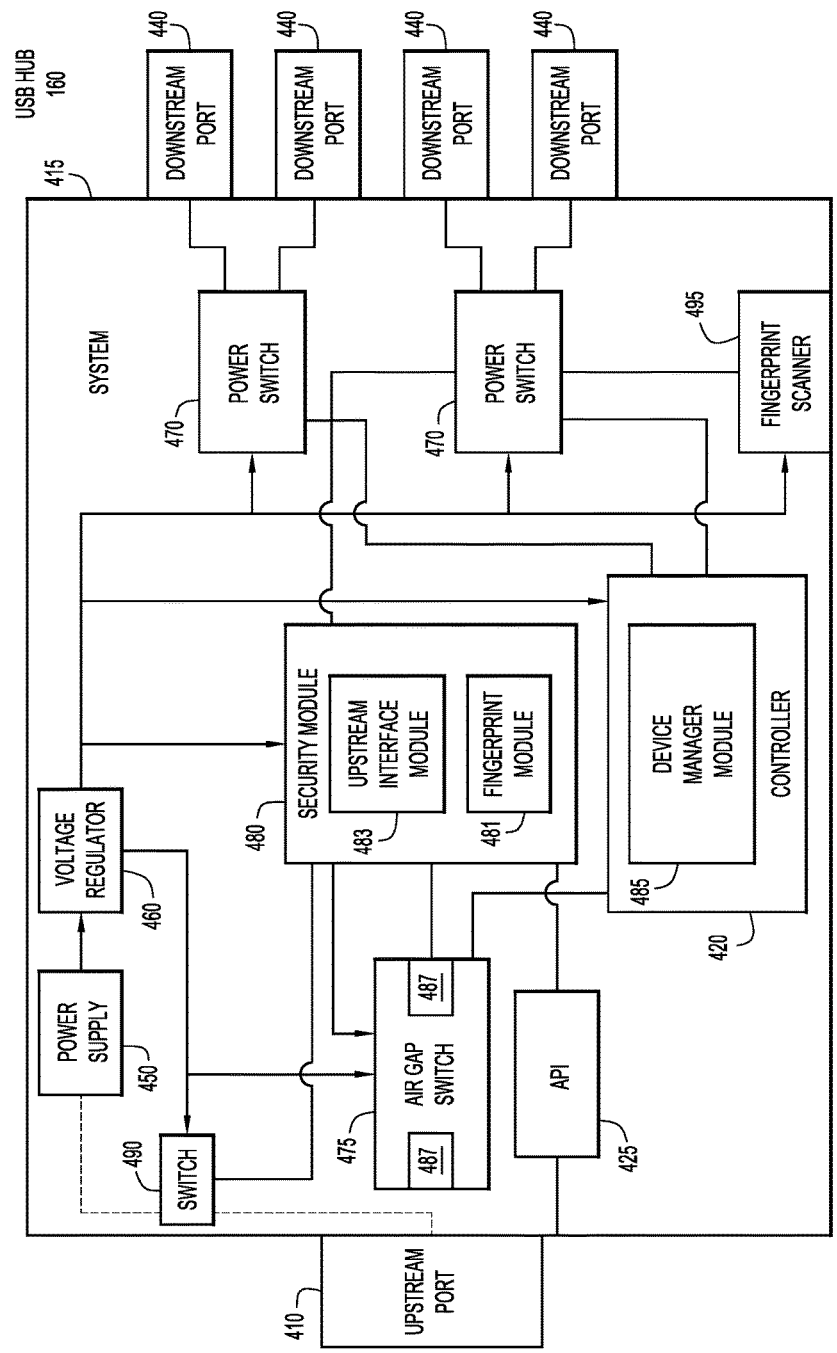
FIG. 5 is another example of a USB hub having a non-programmable controller, according to an embodiment of the techniques disclosed herein.

FIG. 5 shows another embodiment in which the security module 480 (including fingerprint authentication unit 481) is physically integrated into the stand-alone USB hub 160 separately from the controller 420. Power switch 470 is also shown. In this embodiment, the power that enables the upstream port 410 to communicate with the downstream port(s) 440 is provided by the same source that powers the security module 480. (Here, the security module provides power to the air gap switch). The security module 480 is configured to always be in an active state (i.e., cannot be inactivated) while the upstream and downstream port(s) are configured to permit transfer of data. If the security module 480 is not receiving power, then power is also disconnected from the air gap switch 475 connecting the upstream interface 410 to the ports 440, thereby maintaining a normally open circuit state between the upstream and downstream ports and preventing any communication to the data storage media. In general, when there is a transfer to/from data storage, the user will need to authenticate or re-authenticate using the security module 480, e.g., the fingerprint authentication module 481. Unless indicated otherwise, the components of FIG. 5 function in a same or similar manner as the components of FIG. 4.

Figure 6:
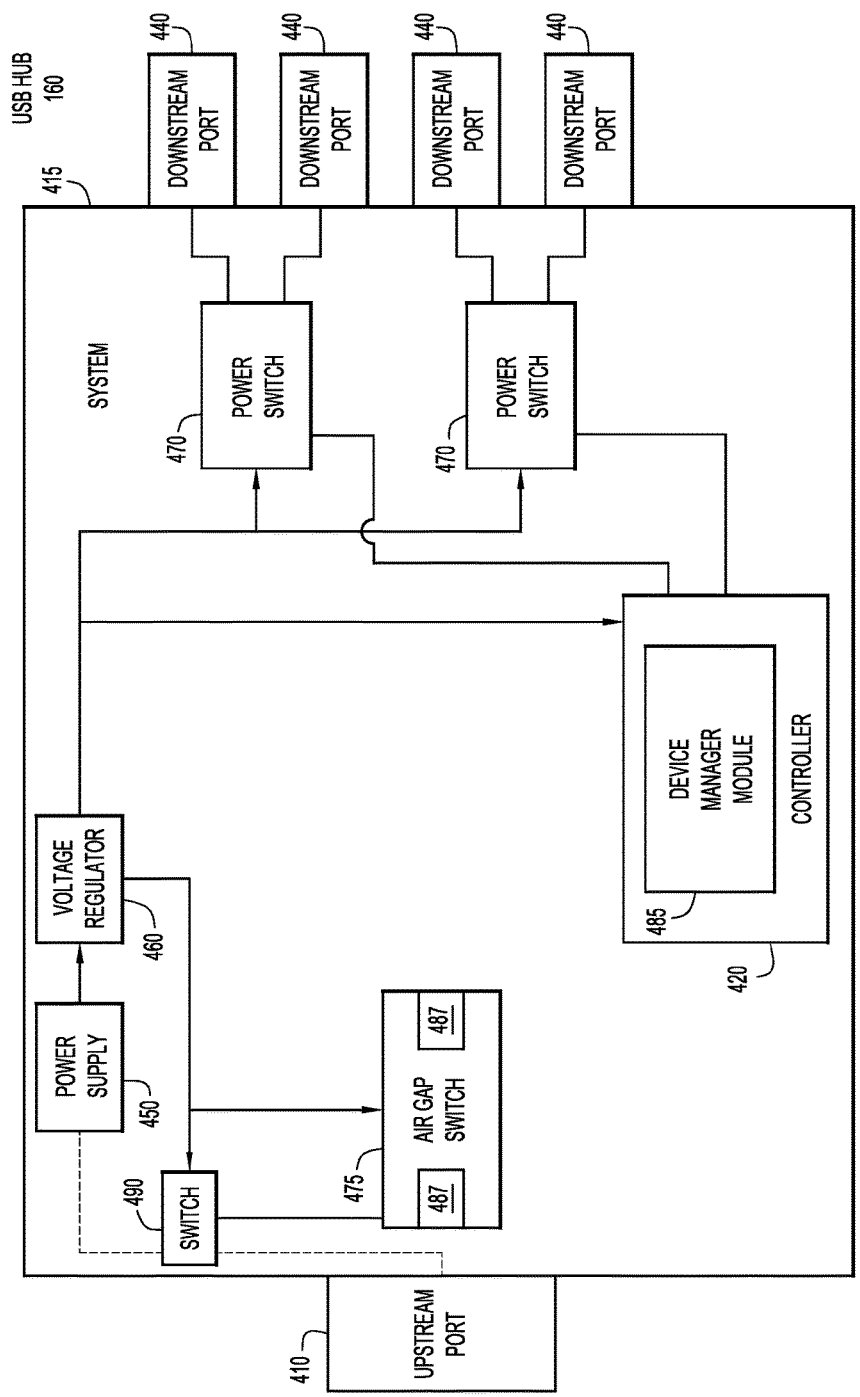
FIG. 6 is another example of a USB hub having a switch, according to an embodiment of the techniques disclosed herein.

FIG. 6 shows another embodiment in which a simple manual switch 490 is substituted for the security module 480/fingerprint module 490 for certain applications where there is only one user or limited access to the computer being protected. In this embodiment, the switch 490 is configured such that it cannot be switched closed and remained closed by the user or operator. For example, in one aspect, the switch could be spring loaded, such that a user could close the circuit, providing a signal to start the transfer of data. The switch then returns to its original position, and further input (closing the switch again) would be required from the user in order to transfer additional data to the data stores 170(1)-170(4). In general, when there is a transfer to/from data storage, the user will need to authenticate or re-authenticate using the switch 490. Additionally, a manually actuated switch or toggle switch as described herein can be provided (e.g., as a switch on the USB hub 160).

In any embodiment of the invention, the security module/ airgap switch 475 (incorporated in the external USB hub 160 or external thereto but that automatically disconnects the data storage media 170(1)-170(4) from the computer 105(1)) must, after a predetermined amount of time of non-use, require re-authentication for reconnection (e.g., by a switch 490 or fingerprint module 481) to resume data transfer capability. Ideally, the air gap switch 475 will revert to its open (un-bridged) state in the shortest interval feasible, so that the open circuit or "air gap" between the upstream and downstream ports is not bridged for a moment longer than is necessary to complete the current data transfer.

Therefore, an embodiment of the invention includes a method for monitoring the USB hub 160 to identify precisely when the interface is no longer transmitting traffic between the upstream (310/410) and downstream ports (340(1)-340(4)/440). In one embodiment, a USB hub comprises a device manager (485) configured to measure characteristics associated with each input into the system 415/ 515 from the upstream interface 310/410, e.g., current, voltage, data transfer rates, power consumption, etc.). In some embodiments, a threshold may be programmed, in order to establish a cut off between an active and an inactive state of an input reflecting transmittal of data. For example, differences in characteristics between when the air gap switch 475 is closed (i.e., data is being transferred) and when it is not (i.e. data is not being transferred) can be determined. As soon as the voltage/power/current drop is detected for a specific period of time indicating that data transfer is complete (e.g., the specific period of time may be selected to be large enough in order to tune or filter out transient fluctuations associated with the operation of data transfer), a control element within USB hub 160 shuts off all power to the interfaces or sends a signal to the switch, and the air gap switch 475 opens. It is understood that transient fluctuations, associated with queueing and buffering operations or other data transfer operations will not lead to a premature closing of the air gap switch.

In other embodiments, it is desirable to transfer data from data store device to the USB hub. Authentication is also required for this operation.

The security module 380/480 is configurable, offering a variety of options to control the frequency of providing user authentication. For example, in the event that a timer is used, the system may be configured to request re-authentication every 5 minutes, 10 minutes, 20 minutes, 30 minutes, hour, two hours, three hours, four hours, etc. as well as any number in between these ranges. In some embodiments, if a flag (from the computing device 105(1) goes high, indicating a likelihood of malware presence, the period of authentication is terminated early (prior to the end of the designated time period).

A timer can be configured to open the switch or air gap 375/475 (e.g., as part of the upstream interface model 383/483) after a predetermined interval after fingerprint authentication occurs using the fingerprint module 381/481 or after switch 390/490 has been switched into an active state. Once the interval of time has passed, and the data transfer session times out, the air gap switch 575 is triggered to reopen, and the air gap switch can be bridged by another fingerprint authentication with fingerprint authentication module 381/481 or manual switch activation with switch 390/490. Experts in the field could utilize other techniques for ensuring that the default condition has the air gap switch as open, however, resetting the USB hub 160 (air gap switch 385/485) to the default condition of open after a predetermined interval of time has passed provides another level of security preventing a user from bypassing re-authentication by tampering with switch 390/490 or fingerprint authentication module 381/481. The time interval can be adjustable, allowing users to determine a frequency of re-authentication, but not unlimited. For increased security, a user can select a smaller time interval. For more relaxed security, a user can select a longer time interval.

If there is a power shutdown of the USB hub 160, a data store 170(1)-170(4) or from the user computing device 105(1), the system will automatically default to its open state (i.e. such that data cannot be transferred).

In some scenarios, there is always the possibility that the computer/workstation 105(1) experiences a ransomware attack during the period of time when the air gap switch is bridged (closed) to allow a legitimate data transfer to take place. In this scenario, the ransomware might be able to "piggy back" on the legitimate data transfer underway and reach and encrypt the downstream data storage media. Incorporating a specific time interval after which the air gap automatically re-opens (default configuration), helps to address this type of threat.

Persons skilled in the art will recognize that the encryption of data files involves an application that resides on the computer/workstation 105(1), not in the data storage media 170(1)-170(4). In an encryption scheme, the data, referred to as plaintext, is encrypted by the application using an encryption algorithm, generating cipher text that can be read only if decrypted. For technical reasons, an encryption scheme usually uses a pseudorandom encryption key generated by an algorithm. Encryption processes may be detected by being unable to open files and by detecting changes in voltage/current/power consumption, e.g., from encryption processes used to encrypt large number of files.

Ransomware may also be detected based upon known file extensions, monitoring rates of file renaming, the presence of exploit kits that accompany ransomware files, and by detecting large modifications of network shares or drives in alphabetical order. In other embodiments, software specifically designed to detect malware may be installed on a computer, e.g., such as Malwarebytes, and functions to detect malware by monitoring changes to the operating system, and in particular, the operating system registry for text strings known to be associated with ransomware; detecting the presence of droppers, which are small applications that infect target machines before receiving the primary malware payload. In some embodiments, when malware is detected, the computing device 105(1) and the USB hub is powered off until the malware (if present) is removed from the system.

In general, the ransomware applications currently in use produce a cipher text that is not easily decrypted. This implies a well-designed encryption scheme requiring some degree of computing capability. The encryption process is also not instantaneous. Thus, to encrypt the data stored on data store 170(1)-170(4), the plaintext data stored on the data store may be moved to the computing device 105(1) where it is encrypted using an encryption algorithm and then transmitted back to the data storage 170(1)-170(4) in cipher text form. Alternatively, for instances in which the data store has sufficient processing capabilities, the ransomware may attempt to install itself on the data store to encrypt plaintext at the site of storage.

Persons skilled in the art will recognize that with a fixed and very short time interval determining when the air gap switch will re-open between the upstream 310/410 and downstream ports 340(1)-340(4)/440 in the USB hub 160, in the piggy back scenario noted above, it is likely that the air gap switch 375/475 would resort to its open default condition before all, or even any, of the data could be encrypted.

For the air gap switch 375/475 to be bridged and for data to flow between the computer 105(1) and the data store 170(1)-170(4), the valid operator authenticates using the fingerprint module 381/481 or by activating manual switch 390/490. In some embodiments, the ability of a user to re-authentication relies upon receiving an "OK" signal from the anti-virus/security software loaded on the computer or workstation 105(1). When the computer/workstation 105(1) is under attack by the ransomware, that signal would not be generated and the user is blocked from re-authentication.

One will immediately recognize the importance of a capable anti-virus software package capable of detecting the current ransomware threats (and future threats, with proper updates) as a collaboration asset in this method for defeating ransomware attacks. The combination of time interval capability with a capable anti-virus software package available to individual users and SMBs presents an even more ideal defense.

There are several commercially available anti-virus software options that can detect ransomware, such as Malwarebytes Anti-Ransomware, Hitman Pro Alert, Norton by Symantec, etc. Anti-virus detection methods and software are known in the art and are incorporated by reference herein.

For known ransomware, the key role for the anti-virus software or other application is simply to detect the ransomware. This may be as simple as receiving an indication that the ransomware has already begun encrypting the data files on the computer's internal drives, e.g., from a signal originating from the computing device 105(1) or anti-malware/anti-viral software installed on the computing device. Typically, once the malware encryption process has started, the drives are no longer accessible by the operating system (or the anti-virus software), so as soon as one or more of those drives (or other system elements) are not accessible, the anti-virus software will present an on screen warning that the operator is not to touch the fingerprint authentication scanner 395/495 or may communicate with the USH Hub 160 directly to send a signal triggering opening of the air gap switch 375/475 to override the authentication modules.

In some embodiments, the air gap switch 375/475 of the UBS hub 170(1)-170(4) may be a switch or series of switches that change between an open and closed state for paths that transmit data; in other embodiments the air gap switch 375/475 may be a switch or series of switches that powers down pathways associated with transmission of data between the upstream port 310/410 connected to the now infected computer/workstation and the downstream ports 340(1)-340(4)/440 which link to the data storage drive 170(1)-170(4). Effectively, the "air gap" is in place and remains open unless and until receiving and verifying operator authentication. Then and only then can the air gap be bridged or closed.

As noted, the "air gap" is normally open, so action must be taken to bridge the gap. In embodiments wherein the USH hub is communicatively coupled to antivirus software on the computing device 105(1), the ransomware cannot reach the data storage medium 170(1)-170(4) unless: 1) the anti-virus software fails to recognize the encryption activity underway; 2) the anti-virus gives a false "OK" signal to the operator; and/or 3) the operator physically initiates the fingerprint authentication process without seeing, or in fact ignoring, the "No Go" warning signal from the anti-virus software. In some embodiments, the anti-virus software will issue a no-go signal to the screen and will send a signal to USB Hub 160 to place the air gap switch in an open state, e.g., that requires power cycling or rebooting to reset, overriding user authentication capabilities.

Because there is no direct connection between the fingerprint authentication module 381/481 incorporated in the proposed self-powered USB hub and the computer/workstation 105(1), it is not possible for the ransomware, or any other virus, to close the air gap; physical intervention/action by the operator is required.

The industry is aware of organizations loading entire operating systems on a USB drive for a variety of purposes, so that if the USB drive receives power, it can emulate the computer 105(1) and either attempt data theft or, more likely, attempt a cyberattack involving encryption of data stored on computing device 105(1) and data store 170(1)-170(4). In the preferred embodiment, the fingerprint authentication module or switch 481 would not be compromised; therefore, an attack from the USB hub would be prevented. In this manner, the invention serves both to defeat ransomware attacks but also to help counter cyber espionage threats that attempt to attack the computer/workstation 105(1) by accessing it via the USB hub 160 or from data storage media 170(1)-170(4).

The fingerprint authentication subsystem need not be elaborate; nor does it have to include a memory to store a particular operator fingerprint for access authentication, although that function could be included for extra security. The primary function is to force human operator involvement in order to temporarily close the air gap. The fingerprint sensor is the preferred method for the operator to switch the condition of the air gap from open to closed because it prevents incorrect or inadvertent actions that might compromise the system. For example, an object such as a book could come into contact with a toggle or simple pressure switch and force the device to an incorrect setting.

In parallel with this, the invention would not incorporate any means for the ransomware to access the data storage media using a WiFi signal. In order for the computer to remotely access the data storage media there would have to be an external WiFi (or Bluetooth or near field communication (NFC)) capability connected to the upstream port 410. The same fingerprint (or manual switch) authentication process would be required to bridge the air gap switch 475.

With the air gap switch 375/475 having an open circuit as its default condition, the operator/user must therefore perform an action to close it. In some embodiments, the operator will re-authenticate when he/she starts work with a particular application (Microsoft Word, Adobe Photoshop, Citrix Quickbooks, etc.) or, if the application is already running, when he/she works on a different existing file. In some embodiments, the application will typically prompt the user to re-authenticate because, due to the air gap, the storage medium that holds the data file is either not seen by the computer/workstation 105(1) or is unable to write to the data store, and therefore, the data store cannot be accessed.

At work start, or when the application returns a "file not found" signal e.g., from an plaintext file being encrypted, the operator triggers the anti-virus software to run a check on the computer/workstation, the results of which will be displayed on the screen as either a "Go" or "No Go" type warning. If "No Go," the operator ceases the work session and notifies the system administrator or takes specific individual action to shut down the computing device 105(1) and proceed with removing the ransomware from the computer/workstation 105(1). In any case, the integrity of the valuable data files is preserved, and the operator can disconnect the self-powered USB hub from the infected computer 105(1), connect it to a separate computer that is virus free, and continue working, e.g., while a cyber security team deals with the infected machine.

If the anti-virus software returns a "Go" signal on screen, then the operator goes forward with the fingerprint authentication process which, if the operator is authorized to use the computer/workstation 105(1), will result in the self-powered USB hub closing the air gap switch 375/475 and enabling the digital file transfer to occur. When the operator removes his or her finger from the fingerprint authentication subsystem pad, the system automatically opens the internal circuit and thereby isolates the computer/workstation from the data storage media. The default condition for the air gap is always open.

A prerequisite security requirement is that no important data is stored only on the computer hard drive 105(1) itself. This has become the norm for many individuals and SMBs, especially those that have had PC hard drives die during normal operations. Many very compact, high capacity storage devices are now available in the market from companies like Seagate and Toshiba. These compact storage devices can and should be used as backups to the computer hard drive as a matter of course as described in this application.

It is anticipated that the anti-virus software may generate false positives and present the "No Go" warning on screen when there in fact is no threat. This condition can be easily checked and, in any event, the valuable data files remain safe.

Persons knowledgeable in the field of cybersecurity will recognize that ransomware is a dynamic threat with sufficient reward to attackers for them to constantly update existing techniques and devise new ones. Accordingly, there is no certainty that anti-virus software suppliers can anticipate all ransomware configurations. It is also true that computer users are not always current with installing anti-virus and operating system updates. In order to ensure that the operator is warned under any and all cases that the computer/workstation is under ransomware attack, the system of the present invention may also include a simple software adjunct installed on the computer/workstation when the proposed USB hub is first connected. This software application comprises an application that creates a simple data file that resides on the desktop of the computer and contains nothing more than the names of the days of the week or some other innocuous information. This simple file would then be unprotected and "out in the open". If a ransomware virus attacks the computer, this simple file would be one of the first data files to be found and encrypted. As such, it serves as the "canary in the coal mine." The system continuously tries to read the data in that unprotected desktop file and, once it is no longer able to do so (i.e., because it has been encrypted by ransomware), the system immediately displays a warning on the computer screen alerting the operator to not initiate a data transfer or, in general, to not touch the fingerprint authentication pad or other means by which the processor has been disconnected from the external data storage drive.

Some may see as tedious the need to repeat the anti-virus check/fingerprint authentication process every time a new data file is transmitted or if work on a particular file is to be saved to the data store. However, those that have had to deal with the expense and headaches of a successful ransomware attack may see it otherwise.

Figure 7:
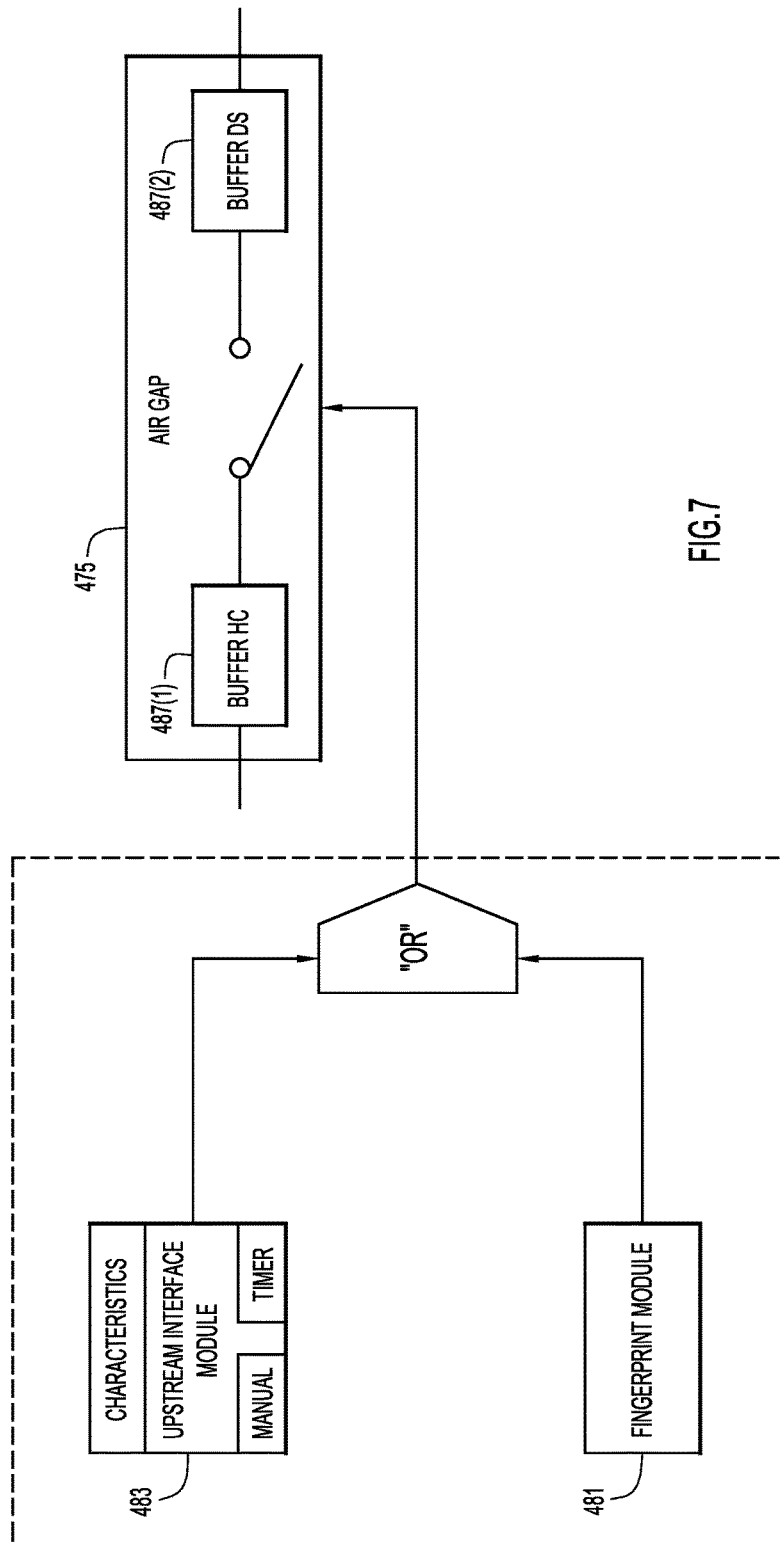
FIG. 7 shows another example configuration of an air gap switch, according to an embodiment of the techniques disclosed herein

FIG. 7 provides a configuration that would offer protection while a transfer is occurring (after a previous authorization) while reducing the number of times that authentication would be required. In this example, air gap switch 375/475 has a buffer on each side of the switch. Data to be written to the data store can accumulate in the buffer HC 487(1), which can hold multiple files. Once the switch is closed, the data is transferred to the other buffer DS 487(2), and then sent to the data store 170(1)-170(4). Similarly, or alternatively, data to be accessed from the data store 170 (1)-170(4) can be stored in a buffer DS, which can hold multiple files. Once the switch is closed, the data is transferred to the other buffer HC 487(1), and then sent to the computing device. In some embodiments, the user is prompted for re-authentication when the buffer is full.

Buffers also prevent generation of corrupt or incomplete files, which may occur if transmission is terminated during a file transfer. FIG. 7 also shows inputs (e.g., detection of characteristics of malware/ransomware processes, expiration of a timer, a manual reset or an authentication fail) which can lead to opening of the air gap switch 375/475.

The preferred embodiment of the invention creates an operating environment that includes:
- the processor in the operator's computer/workstation;
- the invention, connected to the computer/workstation by any of the industry standard USB cables (or their Apple IOS equivalents); and
- the external data storage media connected to the invention.

Figure 8A:
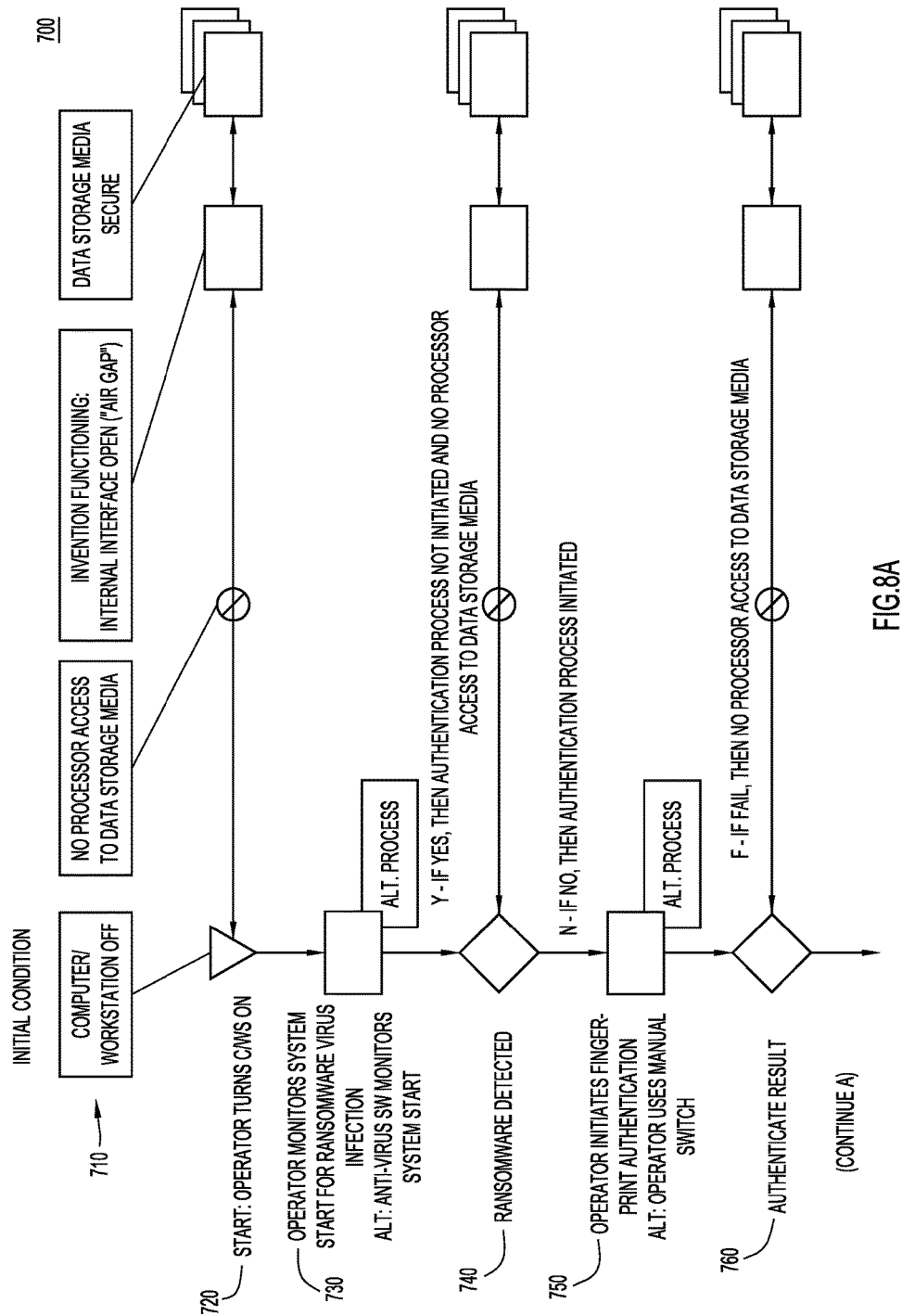
FIGS. 8A-8B show example of logic states according to the operation of the USB hub, according to an embodiment of the techniques disclosed herein.
Figure 8B:
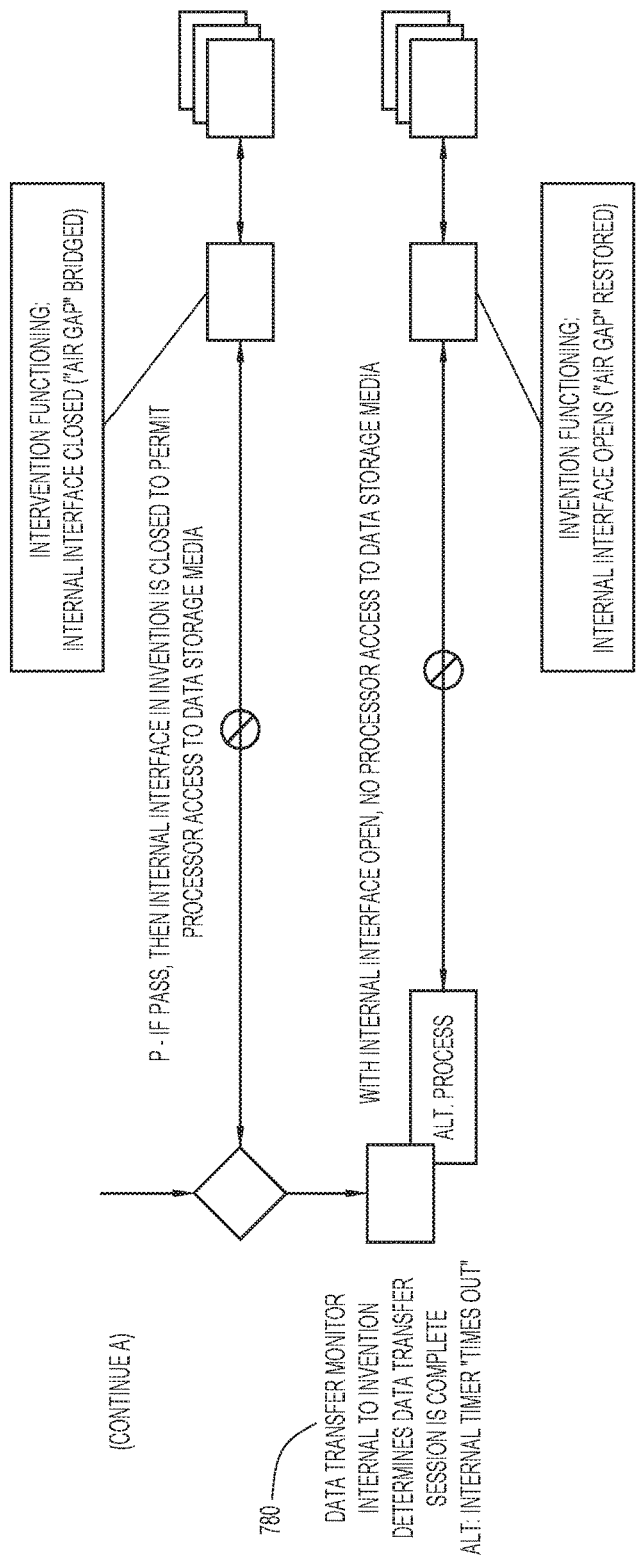

The process is represented in the logic and flow diagrams of FIGS. 8A-8B shows a logic diagram 700. State 710 shows the computer workstation being in an off state, and the data storage media is inaccessible by the workstation processor. At state 720, the workstation is turned on. At state 730, the workstation boots up and the workstation is monitored for ransomware. In some embodiments, a user monitors the workstation for a message indicating that the ransomware is present on the computing device, e.g., such as a message on the display screen requesting payment, an inability to access encrypted files, sluggish response times, etc. In other embodiments, an anti-virus software or operating system may provide alerts regarding unauthorized access or of system resources. In still other embodiments, a device manager of the USB hub may report deviations in voltage/current/power characteristics as compared to a normal operation profile.

At state 740, the results of the startup determine next steps in the logic flow. If the computing device and the corresponding data being transmitted appears not to be infected, an OK signal is sent to the USB hub 170(1)-170(4). The user may provide authentication thereby initiating the authorization process as needed to access and backup files from the data storage. Otherwise, if malware is detected or suspected of being present on the computing device, the authentication process is blocked, e.g., by sending a signal to the USB Hub or to the display screen of the computing device indicating that the malware is detected. Here, the air gap switch 375/475 remains open until the malware has been removed.

At state 750, malware has not been detected, and therefore, the user may provide authentication (e.g., via a switch or fingerprint authentication) to obtain access to the data store, via closure of the air gap. If authentication fails, access is not provided and the air gap stays open. If authentication passes, then the air gap switch 375/475 is closed and access to the data store 170(1)-170(4) is permitted. At state 760, once the transfer is complete, the air gap switch is reopened, and access to the data store is again denied. The reauthentication process must be repeated in order to gain subsequent access to the data storage devices. At state 780, a data transfer monitor internal to the invention may determine when the data transfer session is complete. Alternatively, the internal timer may "time out."

Figure 9:
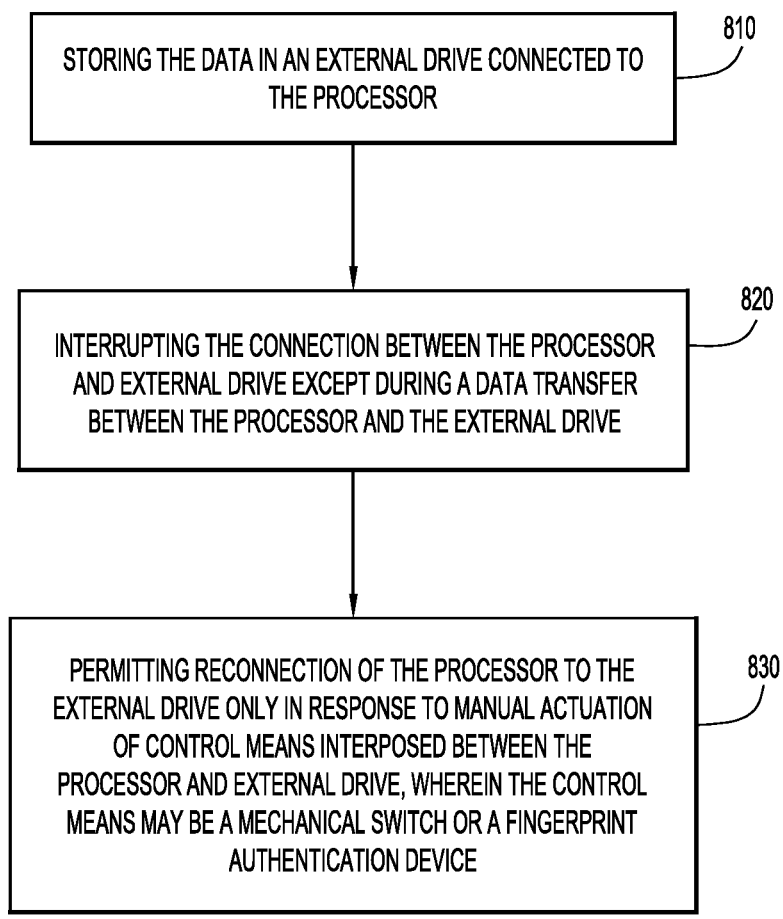
FIG. 9 is another example of a flow chart depicting at a high level, the operation of the USB hub device, according to an embodiment of the techniques disclosed herein.

FIG. 9 shows example operations of the hub device, at high level, according to an embodiment of the invention. At operation 810, the data is stored in an external drive connected to the processor. At operation 820, the connection is interrupted between the processor and external drive, except during a data transfer between the processor and the external drive. At operation 830, reconnection of the processor is permitted to the external drive when manual actuation of control means interposed between the processor and external drive occurs, wherein the control means may be a mechanical switch or a fingerprint authentication device.

One of skill in the art will understand processes by which the main processor in a computer retrieves data and other digital information from storage devices (internal hard drives, external drives, USB thumb drives, and internet-based storage arrangements such as the SaaS cloud models noted above) and returns that data to the storage media. These processes are well known in the industry.

Computing device 105(1) and 105(2) include one or more processors configured to perform the respective functions associated with the computing device as described herein. The one or more processors may execute code instructions stored in memory, for example. In some embodiments, USB hub may include one or more processors to perform the respective functions associated with the USB hub as described herein.

In general, program modules (e.g., upstream interface module 310, fingerprint authentication module 381, device manager module 485, etc.) may include routines, programs, components, data structures, etc., that perform particular tasks or implement particular abstract data types. Modules may be coupled to hardware, e.g., power regulators, sensors, etc. to perform respective functions. The systems and methods presented herein may be practiced with other computer system configurations, including single-processor or multi-processor computer systems, minicomputers, personal computers, hand-held computing devices, microprocessor-based or programmable consumer electronics, etc., each of which can be coupled to a USB hub.

Computing devices typically include a variety of different types of media, including computer-readable storage media, which includes storage media that can be accessed by the computer. By way of example, and not limitation, computer-readable storage media can be implemented in connection with any method or technology for storage of information such as computer-readable instructions, program modules, structured data or unstructured data. Computer-readable storage media can include, but is not limited to, random access memory (RAM), read only memory (ROM), electrically erasable programmable read only memory (EEPROM), flash memory or other memory technology, or other tangible and/or non-transitory media which can be used to store desired information and is rewritable. In this regard, the terms "tangible" or "non-transitory" herein as applied to storage, memory or computer-readable media, are to be understood to exclude only propagating transitory signals.

Computer-readable storage media can be accessed by one or more local or remote computing devices through a USB hub for, e.g., access requests, queries or other data retrieval protocols, for a variety of operations with respect to the information stored by the storage medium.

The computer 105(1) can operate in a networked environment using via wired communications to one or more remote computers. The remote computer(s), e.g., computing device 105(2) can be a workstation, a server computer, a personal computer, portable computer, microprocessor-based entertainment device, a peer device, etc. and typically includes many or all of the elements described relative to the computer 105(1), Wired connectivity to a local area network (LAN) 140 and/or larger networks, e.g., a wide area network (WAN) 140. Such LAN and WAN networking environments are commonplace in offices and companies, and facilitate enterprise-wide computer networks, such as intranets, all of which can connect to a global communications network, e.g., the Internet. It will be appreciated that the network connections shown are example and other means of establishing a communications link between the computers can be used.

Although the invention has been described in preferred form(s) with a certain degree of particularity, it will be appreciated by persons skilled in the art that the present invention is not limited to what has been particularly shown and described hereinabove. Rather, the scope of the present invention includes both combinations and sub-combinations of the various features described hereinabove. Various modifications and changes are contemplated and may obviously be resorted to, provided they fall within the spirit and scope of the invention as hereinafter claimed.

I claim:

1. A method for protecting processor data from ransomware in a system having a processor, an external drive, and a hardwired connection between the processor and external drive for transmitting the processor data to the external drive, said method comprising:
   interposing an open air gap switch having a normally open state in the hardwired connection to normally establish a fully open circuit in the hardwired connection preventing data transfer between the processor and external drive unless the air gap switch is in a closed state;
   manually initiating an authorized data transfer of processor data from the processor to the external drive via the hardwired connection by actuating the air gap switch to a closed state; and
   re-establishing the air gap in the hardwired connection after completion of an authorized data transfer by returning the air gap switch to the open state.

2. The method of claim 1 further comprising:
   storing the transferred processor data in the external drive in data storage media electrically separate from and external to the processor; and
   wherein the air gap switch in the open state normally disconnects the storage media from the processor and is selectively actuable by a user to the closed state to connect the data storage media to the processor.

3. The method of claim 2 wherein a Universal Serial Bus (USB) hub is provided having at least one upstream port connected to the processor and at least one downstream port connected to the data storage media, wherein the air gap switch is electrically connected between the upstream port and the downstream port internally to the USB hub, and wherein said method further comprises:
   rendering the air gap switch functional to connect the upstream port to the downstream port only when the air gap switch receives an electrical command, wherein when the air gap switch is in the open state no communication, including any data transfer in either direction, can occur between the upstream port and the downstream port of the USB hub;
   enabling the electrical command to the air gap switch only in response to manual initiation by an authorized user of the authorized data transfer;
   preventing the processor from under any circumstance transferring data to the external drive in the absence of the electrical command initiated by an authorized user;
   providing a default state of the USB hub in which the air gap switch is in the open state to establish an air gap in the hardwired connection and prevent any communication between the upstream port and the downstream port, and
   restoring the default state automatically after completion of the authorized data transfer.

4. The method of claim 3 wherein the step of enabling includes manually initiating the electrical command from circuitry integrated into the USB hub.

5. The method of claim 3 wherein the step of enabling includes manually initiating the electrical command from circuitry external to the USB hub.

6. The method of claim 3 wherein authorized data transfers are initiated by user fingerprint authentication to enable said electrical command signal.

7. The method of claim 3 wherein authorized data transfers are initiated by user actuation of a manually actuable switch to enable said electrical command signal.

8. The method of claim 7 wherein the manually actuable switch requires continuous manual actuation by the user to continue to provide the electrical command signal, whereby removal of the manual actuation by the user causes the manually actuable switch to open and the electrical command signal to be disabled.

9. The method of claim 3 further comprising the step of preventing permanent bypassing of said default state.

10. The method of claim 3 further comprising incorporating a data transfer monitoring capability into the USB hub to detect when the authorized data transfer has been completed and automatically disable the electrical command signal to thereby return the air gap switch to the open state and disconnect the data storage media from the processor.

11. The method of claim 3 further comprising detecting when and if the processor is under attack by a ransomware virus and issuing a warning to the user to not initiate an authorized data transfer.

12. The method of claim 1 further comprising:
   establishing on a system comprising the processor an unprotected file containing innocuous data;
   continuously trying to read the innocuous data by the system;
   in response to being unable to read the innocuous data, displaying a warning alerting the user to not initiate the authorized data transfer.

13. The method of claim 1 wherein the air gap switch is a manually actuable switch, said method further comprising automatically returning the air gap switch to the open state after an authorized data transfer is completed.

14. A system for protecting processor data from ransomware comprising:
   an external data storage drive for storing data having a hardwired connection to a processor for transmitting processor data to the external drive; and
   a selectively actuable interface interposed in said hardwired connection, said selectively actuable interface including a normally open air gap switch which defaults to an open state and interrupts the hardwired connection between the processor and the external data storage drive except during authorized data transfer between the processor and the external data storage drive, wherein the air gap switch reconnects the processor to the external data storage drive only in a closed state of the air gap switch, said closed state being attained only in response to manual actuation of the selectively actuable interface by a user.

15. The system of claim 14 wherein the air gap switch is selected from the group consisting of a normally open mechanical switch and a normally open fingerprint authentication switching device.

16. The system of claim 14 wherein the air gap switch is interposed between the processor and the data storage drive to normally disconnect the data storage drive from the processor, and is selectively actuable only manually to connect the data storage drive to the processor.

17. The system of claim 16,
wherein the selectively actuable interface is a Universal Serial Bus (USB) hub having at least one upstream port connected to the processor and at least one downstream port connected to the data storage media, wherein the air gap switch is part of the USB hub and in the closed state connects the upstream port to the downstream port only when the USB hub receives an electrical command, and wherein when the air gap switch is in the open state no communication, including any data transfer in either direction, can occur between the upstream port and the downstream port of the USB hub;

and further comprising a circuit for:
enabling the electrical command to the USB hub only in response to initiation by an authorized user of an authorized data transfer;
preventing the processor from under any circumstance transferring data to the external drive in the absence of the electrical command initiated by an authorized user;
providing a default state of the USB hub in which the air gap switch is in the open state to establish an air gap in the hardwired connection and prevent any communication between the upstream port and the downstream port; and
restoring the default state automatically after completion of the authorized data transfer.

18. The system of claim 17 wherein said circuit is included in said USB hub.

19. The system of claim 17 wherein said selectively actuable interface includes a fingerprint authentication device for selectively enabling said electrical command signal.

20. The system of claim 14 wherein said selectively actuable interface includes a manually actuable switch for selectively enabling said electrical command signal.

21. The system of claim 20 wherein the manually actuable switch is configured to require continuous manual actuation by the user to continue to provide the electrical command signal, whereby removal of the manual actuation by the user causes the switch to open and the electrical command signal to be disabled.

22. The system of claim 14 further comprising data transfer monitoring means for detecting when the authorized data transfer has been completed and thereupon automatically disabling the electrical command signal to thereby disconnect the data storage media from the processor.

23. The system of claim 14 wherein said air gap switch is a manually actuable switch that automatically returns to the open state when not manually actuated.

* * * * *